July 8, 1924.  1,500,910

C. A. WESSON

VEHICLE DIRECTION INDICATOR

Filed May 23, 1923

Witnesses:
P. W. Hunt
H. Berman

Inventor
C. A. Wesson
By Clarence O'Brien
Attorney

Patented July 8, 1924.

UNITED STATES PATENT OFFICE.

CLYDE A. WESSON, OF ATLANTA, GEORGIA.

VEHICLE DIRECTION INDICATOR.

Application filed May 28, 1923. Serial No. 641,841.

*To all whom it may concern:*

Be it known that I, CLYDE A. WESSON, a citizen of the United States, residing at Atlanta, in the county of Fulton and State of Georgia, have invented certain new and useful Improvements in Vehicle Direction Indicators, of which the following is a specification.

My invention relates to an improvement in direction indicators for vehicles, and has for its primary object the provision of such an indicator wherein the intentions of the driver of the vehicle to make a turn will be indicated to those forwardly and rearwardly of the vehicle, the device being particularly useful for application to touring type vehicles when the side curtains are up, this improved signal box being employed for overcoming the necessity of the operator of the vehicle from extending his arm outwardly as is now the usual practice when making a turn.

A further object of the invention resides in the provision of an indicator that may be readily attached to practically all types of touring vehicles with which I am now familiar, the device being extremely simple of construction, as well as efficient in operation, and one that may be manufactured, marketed and installed at comparatively small cost.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein.

Figure 1:
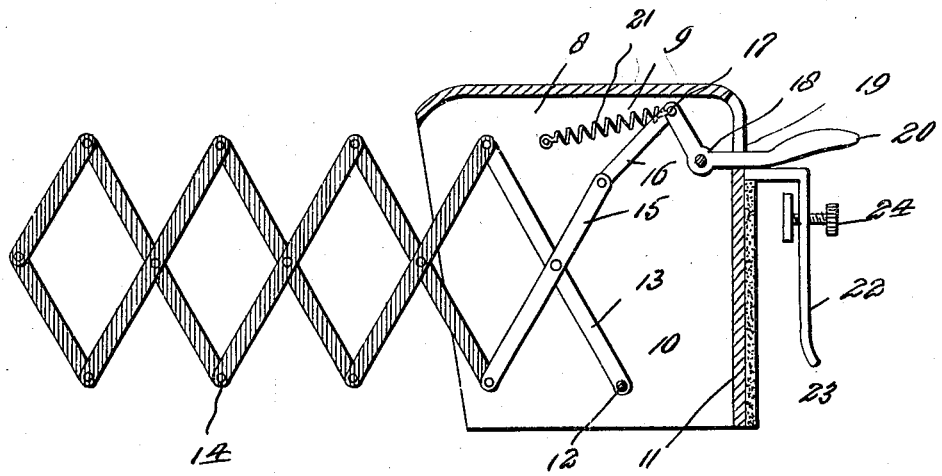
Figure 1 is a detail cross section of the indicator, the indicating arm per se being shown as extended.

In the furtherance of my invention, I provide a form of direction indicator that is particularly adapted for application to vehicles when the side curtains are up, whereby the indicator may be so actuated as to indicate the intentions of the driver to make a turn, and thereby overcome the necessity of extending the arm outwardly of the vehicle. As more clearly shown in Figures 1 and 2, this indicator provides a flat-like metallic casing 8 of suitable dimensions, the same embodying a top wall 9, side walls 10 and inner wall 11. Pivotally secured between the side walls 10 of the casing as at 12 is one end link 13 of a lazy tong arm 14. The other end link 15 of said lazy tong arm has pivotal connection to a link 16, which is in turn pivotally connected at 17 to one arm of a bell crank 18. The other arm of this bell crank extends outwardly of the casing through a slot 19 in the wall 11 thereof, and is formed to provide an operating handle 20. The bell crank 18 is normally maintained in the position of Figure 2 for consequently retracting the lazy tong arm 14 within the casing, through the instrumentality of a coiled spring 21, secured at one end within said casing, and at its opposite end to the said arm 17 of the bell crank.

Figure 3:
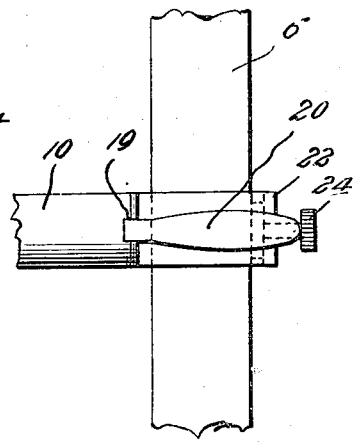
Figure 3 is a fragmentary top plan of the improved device.

Carried by the outer side of said wall at a point adjacent the top thereof is a clamp arm 22 spaced from the adjacent wall of the casing, and adapted for engagement over the inner side of the front door 6 of the vehicle and preferably at the left side thereof. The said wall 11 of the casing carries a fabric casing 23, whereby when the indicator is positioned over the door as in Figure 3, marring of the same will be precluded. The said clamp arm 22 carries an adjustable clamp member 24, preferably of the nature shown, whereby the carrier may be rigidly secured over said door.

Figure 2:
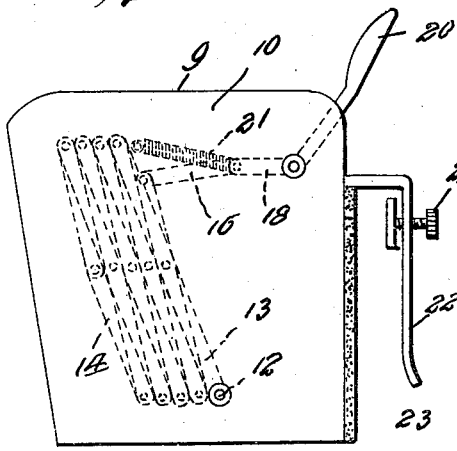
Figure 2 is a side elevation of the indicator, the indicating arm being shown in an inoperative dotted line position.

From the above description, it will be obvious that should the driver of the vehicle upon which my device is installed intend to make a turn, the handle 20 is forced downwardly into the position of Figure 1, for consequently extending the lazy tong arm 14.

Numerous advantages of a device of this character will be readily appreciated by those skilled in the art, and although I have herein set forth the preferred embodiment of the invention, it is nevertheless to be understood that minor changes may be made therein, without departing from the spirit and scope of the invention as claimed.

Having thus described my invention, what I claim as new, and desire to secure by Letters-Patent, is:

A direction indicator comprising a casing, a bell crank lever pivoted within the casing and having an end portion projecting beyond the side thereof, a series of lazy tong bars pivotally connected with each other, the free end of one of the terminal bars being pivoted in the casing, the free end portion of the other terminal bar which is located in the casing being shorter than the free end of the pivoted terminal lazy tong bar, a link pivotally connected with the inner end of the bell crank lever, and pivotally connected with the shorter end portion of the terminal lazy tong bar, a spring connected at one end with the pivot between the links and the bell crank lever and connected at its other end with the casing, the point of connection between the spring and the casing being to one side and above the point of pivotal connection between the crank lever and the casing whereby when the inner end of the bell crank lever is disposed toward the point of pivotal connection between the spring and the casing, the link will be held transversely across the point of pivotal connection between the terminal lazy tong lever bar and the casing.

In testimony whereof I affix my signature.

CLYDE A. WESSON.